United States Patent [19]
Cho

[11] Patent Number: 5,793,234
[45] Date of Patent: Aug. 11, 1998

[54] PULSE WIDTH MODULATION CIRCUIT

[75] Inventor: Dong Soo Cho, Kyungki-do, Rep. of Korea

[73] Assignee: LG Semicon Co., Ltd., Cheongju, Rep. of Korea

[21] Appl. No.: 651,366

[22] Filed: May 22, 1996

[30] Foreign Application Priority Data

May 22, 1995 [KR] Rep. of Korea ............... 1995-12735

[51] Int. Cl.[6] ............................................. H03K 3/017
[52] U.S. Cl. ........................................ 327/175; 327/176
[58] Field of Search .................................. 327/172–176, 327/291, 295; 377/39

[56] References Cited

U.S. PATENT DOCUMENTS

| | | | |
|---|---|---|---|
| 3,836,858 | 9/1974 | Kitano | 327/176 |
| 4,430,617 | 2/1984 | Kuhlmann | 327/176 |
| 4,608,706 | 8/1986 | Chang et al. | 377/39 |
| 5,119,045 | 6/1992 | Sato | 332/109 |
| 5,177,373 | 1/1993 | Nakamura | 307/265 |
| 5,248,900 | 9/1993 | Davis | 307/265 |
| 5,253,155 | 10/1993 | Yamamoto | 363/71 |
| 5,323,438 | 6/1994 | Kim | 377/54 |
| 5,363,406 | 11/1994 | Han | 327/172 |
| 5,377,347 | 12/1994 | Hiiragizawa et al. | 327/172 |

FOREIGN PATENT DOCUMENTS

| | | | |
|---|---|---|---|
| 76129 | 4/1983 | European Pat. Off. | 327/175 |
| 52-42039 | 1/1977 | Japan | 327/175 |
| 63-151211 | 6/1988 | Japan | 327/172 |
| 2235103 | 2/1991 | United Kingdom | 327/175 |

Primary Examiner—Timothy P. Callahan
Assistant Examiner—T. T. Lam
Attorney, Agent, or Firm—Loudermilk & Associates

[57] ABSTRACT

A pulse width modulation (PWM) circuit is disclosed for multiple channels. The circuit allows output pulses of a PWM signal for each channel to be distributed not simultaneously but with a time difference so that the power consumption is temporally distributed. The PWM circuit includes a counter for counting input clocks to generate a counting signal of multiple bits, a counter changing means connected to the counter for changing a bit value of the counting signal, a register for receiving data input from a data bus and holding the received data, a comparator connected to the register and the counter changing means for outputting a setting signal if the bit value counting signal changed from the counter changing means reaches a predetermined level, and outputting a coincidence signal if the compared data of the register and the changed counting signal coincide, and a pulse output portion connected to the comparator for setting output pulses if the setting signal is generated, and resetting the outputs if the coincidence signal is generated. The timing points for output of the PWM pulses are different from one another so as to be distributed.

9 Claims, 3 Drawing Sheets

1

PULSE WIDTH MODULATION CIRCUIT

FIELD OF THE INVENTION

The present invention relates to pulse width modulation (PWM) circuits, and more particularly to PWM circuits that allow output pulses of a PWM signal to be evenly distributed and output with a time difference for each channel in an integrated circuit having a PWM circuit for multiple channels.

BACKGROUND OF THE INVENTION

In general, PWM circuits include a data register, a comparator, a counter and an output circuit. Input pulses are counted by the counter, and a coincidence signal is generated by the comparator if the count result is identical with the data stored in the data register, thereby determining the pulse width.

Multiple channels are generally formed by incorporating a plurality of PWM circuits within a chip. In such a case, the PWM circuit for the respective channels necessitates a data register, a comparator and an output circuit for each of the channels, with a counter commonly used for the channels.

FIG. 1A is a partial block diagram of a conventional PWM circuit for multiple channels, and FIG. 1B is a timing diagram for explaining the operation thereof.

Such a conventional PWM circuit for multiple channels includes counter 10 for counting pulses of input clock signal CK and outputting the counting result as a counting signal, data register 11 connected to a data bus for holding and maintaining the data applied to a bus, comparator 12 connected to data register 11 and counter 10 for comparing the data with the counting signal and outputting a coincidence signal, and output circuit 13 for determining the pulse width using the coincidence signal of comparator 12, as illustrated in FIG. 1A.

At this time, counter 10, comparator 12 and data register 11 are constructed so that a total of n bits (the least significant bit, 0, to the most significant bit, n−1) are processed. The respective bit values of the counting signal, which is an output of counter 10, are connected to counter output bus 14. Comparator 12 installed in each channel has n first inputs and n second inputs, the first inputs being connected to the corresponding lines of counter output bus 14 and the second inputs being connected to the output of data register 11, respectively. Data register 11 is connected to corresponding lines of data bus 15, receives the data applied to data bus 15 to set the data register, and connects the data value to the second input of comparator 12 as illustrated.

Comparator 12 compares the counting signal with the data from data register 11, transmits the coincidence signal to output circuit 13 connected to comparator 12 and transmits an overflow signal if the counting signal reaches a constant value. Output circuit 13 sets a PWM output pulse if a setting signal is received from comparator 12, and resets the PWM output pulse if the coincidence signal is received. Thus, the width of the PWM output pulse is adjusted according to the data applied to the data bus. The cycle of the PWM output pulse is determined by the counting signal output from counter 10. In other words, the setting signal is generated during the overflow of counter 10, and the PWM signal is set or reset by the setting signal.

As illustrated in FIG. 1B, the overflow in the counting operation of the counter generates the setting signal to set the PWM pulse at timing point (a). If the counting signal and data are identical, the PWM pulse is reset. Then, the counter overflows at timing point (b) to set the PWM pulse again.

The thus-operated conventional PWM circuit has multiple channels to obtain several PWM pulses. For example, in order to obtain m PWM pulses, m channels from the first channel to the m'th channel may be provided. The PWM pulses output from the respective channels are set or reset simultaneously during the overflow of the counter, i.e., at timing point (a) or (b), as illustrated in FIG. 1B.

Since the PWM pulses output from the respective channels are set or reset simultaneously, substantial current flows in output drivers at the same time, which may make the voltage of the voltage port for supplying the power unstable. Especially, in case the PWM circuit is an integrated circuit in which the power supply capacity is restricted, instability of the supplied power may become severe, which may result in a malfunction. Such phenomenon deteriorates the operational reliability of the PWM circuit.

SUMMARY OF THE INVENTION

To solve the aforementioned problems, it is an object of the present invention to provide a PWM circuit by which the PWM pulses output from multiple channels are set not simultaneously but with a time difference, so that the power consumption is temporally distributed.

To accomplish the above and other objects, there is provided a PWM circuit for multiple channels comprising: a counter for counting input clocks to generate a counting signal of multiple bits; a counter changing means connected to the counter for changing one or more bit values of the counting signal; a register for receiving data input from a data bus and holding the received data; a comparator connected to the register and the counter changing means for outputting a setting signal if the bit values of the counting signal changed from the counter changing means reaches a predetermined level, and outputting a coincidence signal if the compared data of the register and the changed counting signal coincide; and a pulse output portion connected to the comparator for setting output pulses if the setting signal is generated, and resetting the outputs if the coincidence signal is generated.

BRIEF DESCRIPTION OF THE DRAWINGS

The above objects and other advantages of the present invention will be more apparent by describing in detail preferred embodiments thereof with reference to the drawings in which.

DETAILED DESCRIPTION OF THE PREFERRED EMBODIMENTS

In the disclosed embodiment, a PWM circuit for six channels according to the present invention will now be described, although in other embodiments a different number of channels are utilized.

Figure 1A:
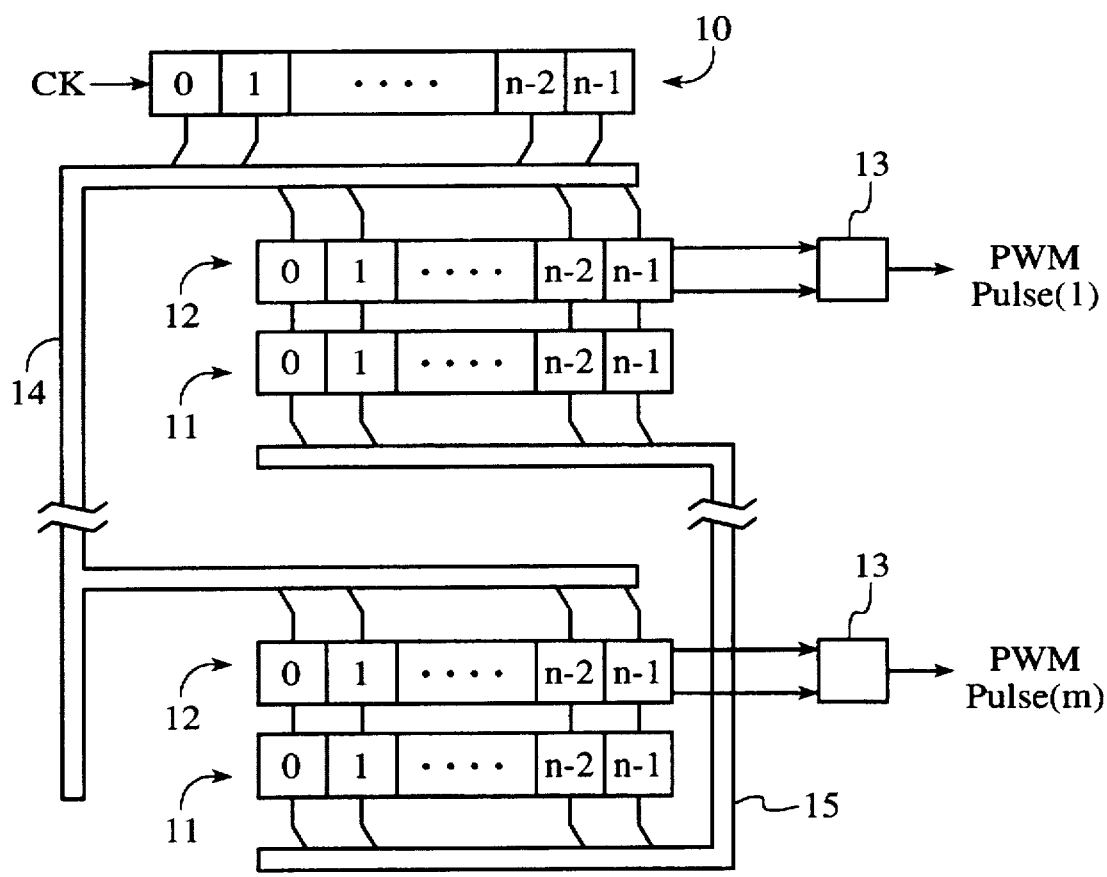
FIG. 1A is a block diagram partially illustrating a conventional PWM circuit for multiple channels.
Figure 1B:
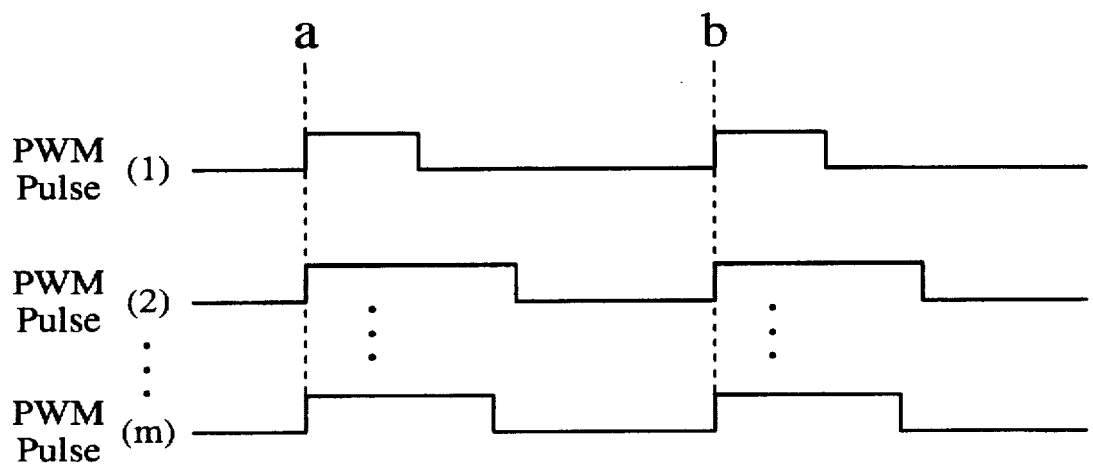
FIG. 1B is an operational timing diagram for the conventional PWM circuit for multiple channels illustrated in FIG. 1A.
Figure 2A:
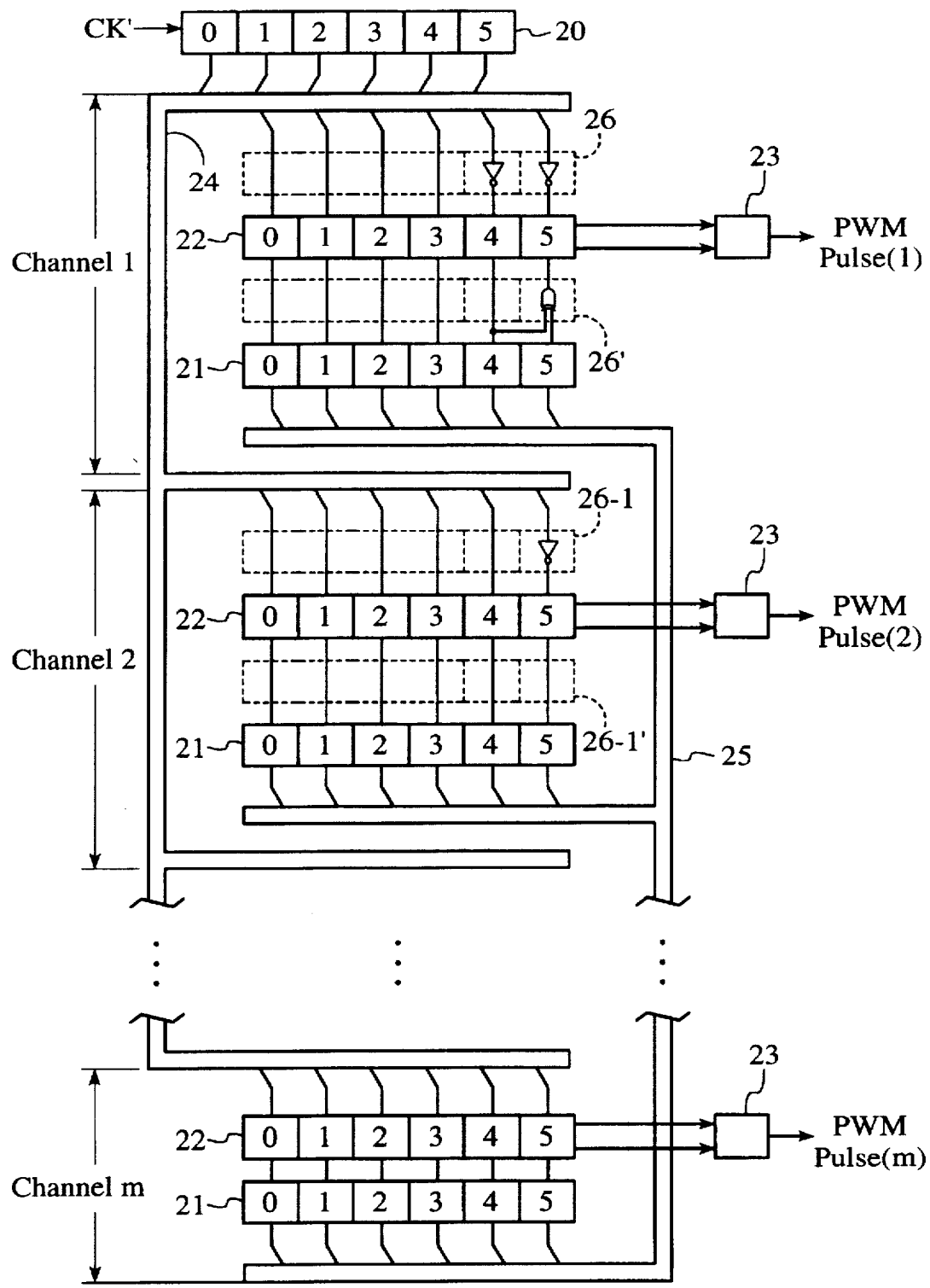
FIG. 2A is a block diagram partially illustrating a PWM circuit for multiple channels according to the present invention.

As illustrated in FIG. 2A, counter 20 for counting clock input CK' is connected to the respective channels via output bus 24 for outputting the counting result. The respective channels have data register 21 for temporarily storing data input from data bus 25 and outputting the same, a counter changing means (e.g., 26, 26-1, etc.) for partially changing (e.g., logic processing) a counting signal output from counter 20, and comparator 22 whose first input is connected to the counter changing means and whose second input is connected to data register 21. A data changing means (e.g., 26', 26-1', etc.) for changing data values is further provided between comparator 22 and data register 21 to adjust (e.g., logic process) output pulses in various ways.

The counter changing means and data changing means may adopt various logic circuits. For example, an inverter may be selectively inserted between the respective bit lines. Otherwise, logic gates such as OR, AND or NAND gates, etc., may be used.

Comparator 22 outputs the setting signal if the changed counting signal reaches a predetermined value. Also, comparator 22 compares the data of data register 21 and the counting signal changed by the counter changing means, and outputs a coincidence signal if they are identical.

In the respective channels, there is a pulse output for receiving and setting a setting signal if the setting signal is generated by comparator 22, or for receiving and resetting a coincidence signal if the coincidence signal is generated by comparator 22.

Counter changing means 26 for the first channel connects the counter output to the first input of comparator 22, by inverting the 2 upper bits of the counting signal, i.e., bit numbers 4 and 5, using an inverter to then connect the corresponding bit line of the counter output to the first input of comparator 22 as illustrated.

The output of data register 21 is connected to the second input of comparator 22 via data changing means 26', which connects the 2 upper bits of the data register, i.e., bit numbers 4 and 5, to bit line number 5 of the second input of comparator 22. Thus, bit number 5 of the second input of comparator 22 has applied thereto a signal which is generated by an XOR-operation on bits 4 and 5 of data register 21. The other bits, i.e., bits 0 to 4, may be connected directly to bits 0 to 4 of the comparator as illustrated.

In the second channel, counter changing means 26-1 inverts bit number 5 of the counting signal using an inverter to connect to the corresponding bit of the first input of comparator 22, and the remaining bits may be connected directly without being inverted. Data changing means 26-1' may directly connect the bits of data register 21 of the second channel to the second input of comparator 22 as illustrated.

Also, in the third through m–1'th channels, the counter changing means and data changing means are connected to comparator 22. At this time, the changed counting signal and the positions of the respective bits are arbitrarily determined in a desired manner by selection of appropriate logic circuits, etc. In the m'th channel, the counting signal from counter 20 may be input to the first input of comparator 22 without change, and the data from data register 21 may not be changed, either, to then be connected directly to the second input of comparator 22. The pulse output portion is connected to the comparator of each channel to output the PWM signal of each channel.

Figure 2B:
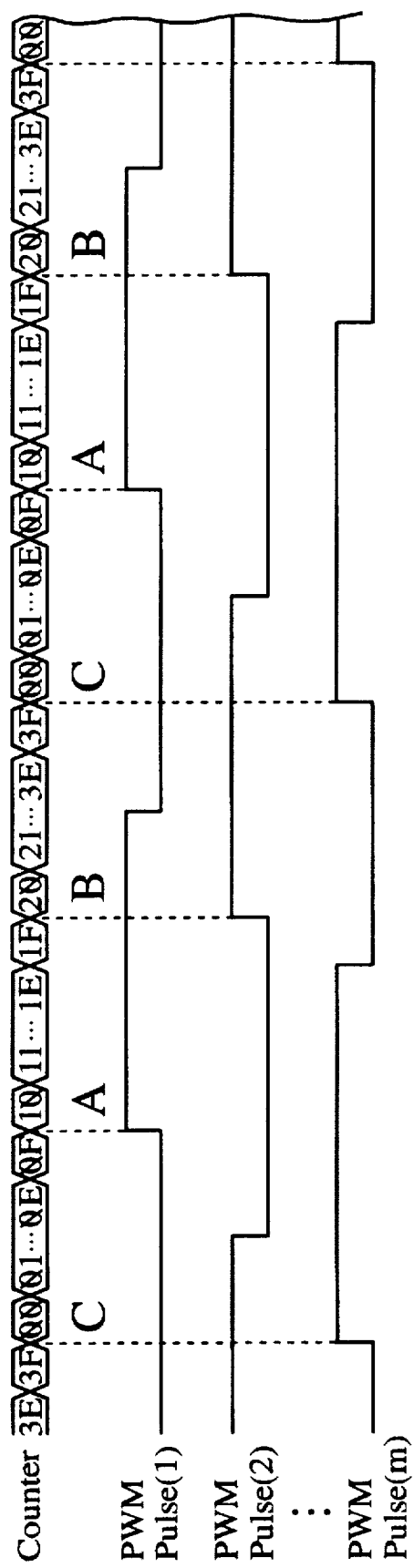
FIG. 2B is an operational timing diagram for the PWM circuit for multiple channels illustrated in FIG. 2A.

According to the operation of this embodiment, the waveforms of the PWM pulses for the first, second and m'th channels may be as illustrated in FIG. 2B.

First, in the case of the m'th channel connected to the comparator without change of the counting signal and data, if the counting signal is $3F, i.e., a predetermined value (here, a value and the PWM pulses output from the pulse output portion is set high. Subsequently, counter 20 continuously counts input clock CK' and outputs a counting signal. If the value of the counting signal becomes the same as the input data value (here, for example, $1E), comparator 22 generates a coincidence signal, and the pulse output portion receives the coincidence signal and resets the PWM pulse to go low.

In the first channel, the bit input values of the 2 upper bits input from counter 20 to comparator 22, i.e., bits 4 and 5, are changed by inverting elements. Also, the bit input value of the most significant bit input from data register 21 to comparator 22, i.e., bit 5, is changed by an XOR element. Thus, if the value of counter 20 becomes $0F, all bits input to the first input of comparator 22 become "1" to generate an overflow so that a setting signal is output. At this time, the pulse output portion sets the PWM pulse to go high. Also, since counter 20 is continuously counting input clock CK', if the value of the counting signal becomes identical with the data value input to the second input of comparator 22, comparator 22 generates the coincidence signal to allow the pulse output portion to reset the PWM pulse.

In the second channel, only the bit input value of the most significant bit input to the first input of comparator 22, i.e., bit 5, is changed by an inverting element. Thus, if the value of counter 20 is $1F, comparator 22 generates the setting signal and the output PWM pulse is set to go high. When the data bit input value of data register 21 input to the second input of comparator 22 becomes the same as the counting signal value input to the first input of comparator 22, the PWM pulse is reset to obtain a waveform of PWM output (2) illustrated in FIG. 2B.

Therefore, although the PWM pulses of the respective channels have the same period as the overflow period of counter 20, the timing points at which the pulses are set high may be different so as to be distributed as illustrated.

In FIG. 2B, for discussion purposes, illustrated reference characters A—A generally represent an output pulse period for the first channel, illustrated reference characters B—B generally represent an output pulse period for the second channel, and illustrated reference characters C—C generally represent an output pulse period for the m'th channel.

In other words, in the PWM circuit for multiple channels according to the present invention, since the output pulses are set or reset at different timing points for the respective channels, the time for power consumption may be more evenly distributed.

In the conventional PWM circuit, assuming that 5 mA flows during operation of one channel if the output pulse goes high, a driving capacity of 20 mA is necessary for simultaneously driving four channels, and 40 mA is necessary for eight channels, etc. In accordance with the present invention, the output pulses may be more evenly distributed to be set for the overall periods of the respective channels, and the current may flow with gradual increase or decrease by 5 mA, which helps stabilize the power of a supply with small power capacity. Therefore, the operational reliability of an integrated circuit having such a PWM circuit for multiple channels may be improved.

Although various preferred embodiments of the present invention have been disclosed for illustrative purposes, those skilled in the art will appreciate that various modifications, additions and/or substitutions are possible without departing from the scope and spirit of the present invention as disclosed in the claims.

What is claimed is:

1. A pulse width modulation (PWM) circuit for multiple channels comprising:

a counter for counting input clocks to generate a counting signal of multiple bits;

a counter changing means connected to the counter for changing one or more bits of the counting signal;

a register for receiving data input from a data bus and holding the received data;

a comparator connected to the register and the counter changing means for outputting a setting signal when the changed counting signal reaches a predetermined level, and outputting coincidence signal in the event of coincidence of data received from the register and the changed counting signal;

a data changing means connected between the register and the comparator for changing selected one or more bits of the received data; and a pulse output portion connected to the comparator for setting an output pulse when the setting signal is generated, and resetting the output pulse when the coincidence signal is generated.

2. A PWM circuit as claimed in claim 1, wherein the data changing means comprises a logic gate.

3. A PWM circuit as claimed in claim 1, wherein the counter changing means and data changing means comprise logic gates.

4. In a multiple channel PWM circuit, a method of generating multiple channels of PWM pulses, comprising the steps of:

(a) counting an input clock with a counter;

(b) logic processing counter data provided by the counter;

(c) providing data input from a data bus and logic processing the data input from the data bus;

(d) comparing the logic processed counter data with the logic processed data input from the data bus;

(e) setting a first channel output signal when the logic processed counter data reaches a predetermined level, and resetting the first channel output signal in the event of the coincidence of the logic processed counter data and the data input from the data bus; and (f) comparing the counter data with the data input from the data bus, and setting a second channel output signal when the counter data reaches a predetermined level, and resetting the second channel output signal in the event of coincidence of the counter data and the data input from the data bus.

5. A pulse width modulation (PWM) circuit for multiple channels, comprising:

a counter for counting input clocks to generate a counting signal of multiple bits;

a counter changing means connected to the counter for changing one or more bits of the counting signal;

a register for receiving data input from a data bus and holding the received data;

a data changing means connected between the register and a comparator for changing selected one and more bits of the received data the comparator connected to the register and the counter changing means for outputting a setting signal when the changed counting signal reaches a predetermined level, and outputting a coincidence signal in the event of coincidence of data received from the register and the changed counting signal;

a pulse output portion connected to the comparator for setting an output pulse when the setting signal is generated, and resetting the output pulse when the coincidence signal is generated.

6. A PWM circuit as claimed in claim 5, wherein the data changing means comprises a logic gate.

7. A PWM circuit as claimed in claim 5, wherein the counter changing means and data changing means comprise logic gates.

8. In a multiple channel PWM circuit, a method of generating multiple channels of PWM pulses, comprising the steps of:

(a) counting an input clock with a counter;

(b) logic processing counter data provided by the counter;

(c) providing data input from a data bus;

(d) comparing the logic processed counter data with data derived from data input from the data bus;

(e) setting a first channel output signal when the logic processed counter data reaches a predetermined level, and resetting the first channel output signal in the event of the coincidence of the logic processed counter data and the data derived from the data input from the data bus;

(f) comparing the counter data with the data input from the data bus; and (g) setting a second channel output signal when the counter data reaches a predetermined level, and resetting the second channel output signal in the event of coincidence of the counter data and the data input from the data bus;

wherein, the first and second channel output signals have different duty cycles and different set/reset times.

9. The method of claim 8, further comprising the steps of:

(a) logic processing the data input from the data bus;

(b) comparing the logic processed counter data with the logic processes data input from the data bus; and (c) setting a third channel output signal when the logic processed counter data reaches a predetermined level, and resetting the third channel output signal in the event of coincidence of logic processed counter data and the logic processed data input from the data bus.

* * * * *